March 17, 1953 K. B. MacDOUGALL 2,631,472
SLACK ADJUSTING MECHANISM
Filed Nov. 16, 1949 2 SHEETS—SHEET 1
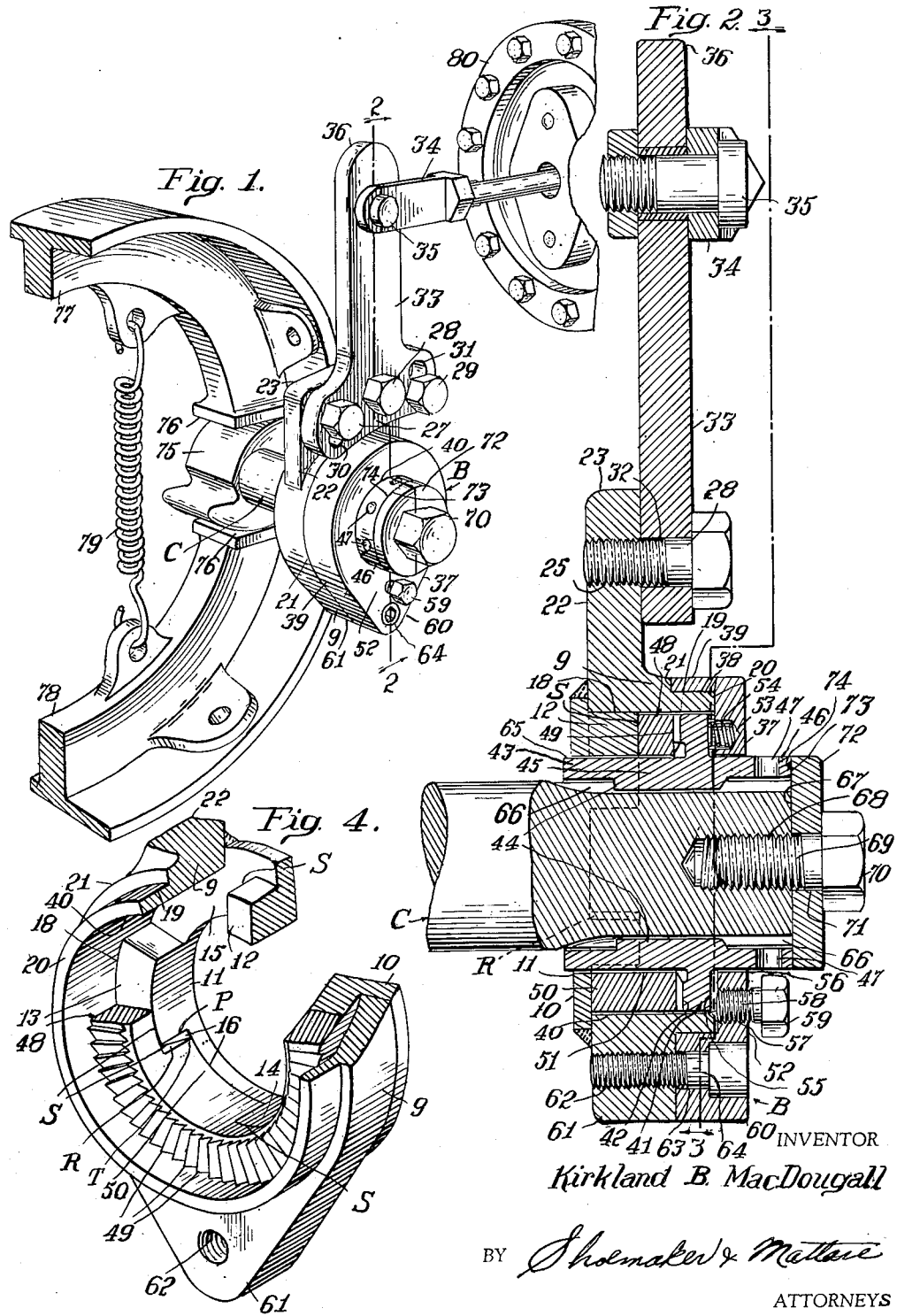
INVENTOR
Kirkland B. MacDougall
BY Shoemaker & Mattare
ATTORNEYS March 17, 1953     K. B. MacDOUGALL     2,631,472
SLACK ADJUSTING MECHANISM
Filed Nov. 16, 1949     2 SHEETS—SHEET 2
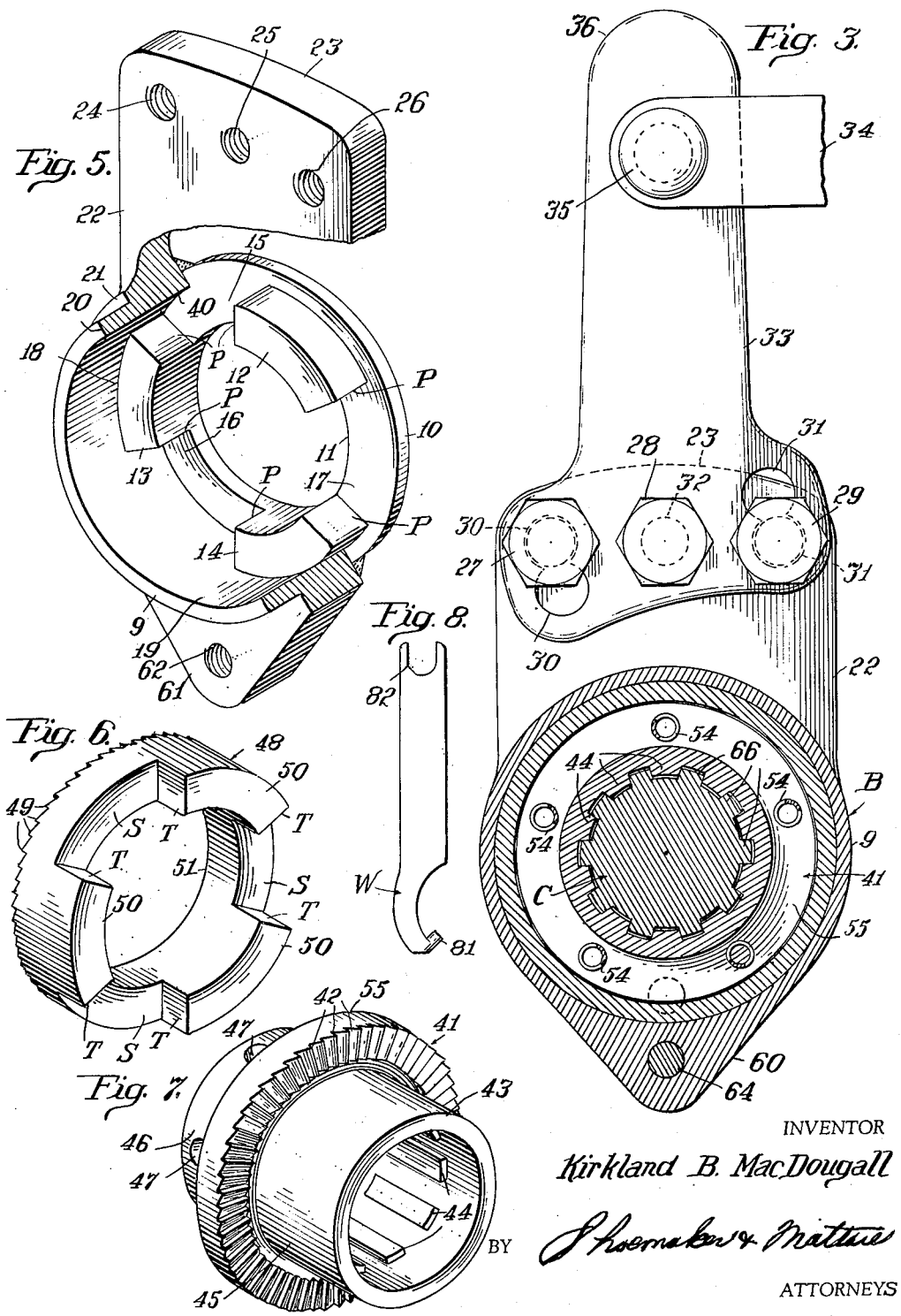
INVENTOR
Kirkland B. MacDougall
BY Shoemaker & Mattare
ATTORNEYS Patented Mar. 17, 1953

2,631,472

UNITED STATES PATENT OFFICE 2,631,472

SLACK ADJUSTING MECHANISM

Kirkland B. MacDougall, Benton, Pa., assignor to John G. Huntley, Pittston, Pa.

Application November 16, 1949, Serial No. 127,587

10 Claims. (Cl. 74—522)

1

This invention relates to an adjustable brake operating mechanism. Automotive and mobile vehicles of various characters are provided with brakes and braking systems which are operated to either stop or slow down the vehicle, whatever type it may be such as a bus, truck, trailer truck, etc.

It is well known that the brake bands or brake blocks or brake linings, or whatever the friction applying means may consist of, and when mounted in the brake drums or the like of motor vehicles, wear occurs during use and application of the brakes of the vehicle in the frequent slowing down and complete stopping of the vehicle. In the majority of cases, it requires quite some time and expense to properly and effectively readjust the brakes that have become worn through use; and where a large fleet of trucks, trailer trucks, buses or the like are concerned, it requires considerable maintenance and consequent expenses and loss of services of the vehicles when the brakes must be adjusted.

In recent years, attempts have been made to apply brake adjusting devices to the brakes of vehicles, some of which devices operate automatically as regards adjustment and others requiring manual or mechanical adjustment of the brakes to reset the braking means whether it be brake shoes, brake linings, etc., to an adjusted and effective braking condition. Such prior devices have proved satisfactory but the braking industry is in need of relatively simple mechanically adjustable means for adjusting the brakes of vehicles and one which an ordinary truck or bus driver can very rapidly and effectively adjust brakes while the vehicle is in service. For instance, a bus, truck or trailer truck or the like, traveling in mountainous areas, does cause considerable wearing of the brake bands, brake blocks or other friction applying means that effect braking of the vehicle, and the brakes of the vehicle require immediate adjustment so that the braking of the vehicle will be constant and consistent when in use.

In my manually or mechanically operated brake operating mechanism, I provide a very simple and effective means whereby the brakes of a vehicle, whatever type it may be, can be quite effectively and rapidly adjusted by the operator of the vehicle.

With the aforementioned in mind, it is an object of my invention, therefore, to provide very simple and relatively inexpensive brake operating mechanism that can be manually or mechanically adjusted by the operator of a vehicle, and not requiring the services of an expert mechanic.

2

Another object of my invention is to provide a mechanically adjusted brake operating mechanism whereby a simple turning movement of a wrench that is applied to the said mechanism effects a proper resetting and adjusting of the brakes—the brake bands, brake blocks, or other friction applying means—so that the braking system, whether it be mechanical, pneumatic, vacuum or the like, may properly function at all times.

Another object of my invention is to provide a mechanically adjustable brake operating mechanism consisting of a relatively few parts which, when assembled together, result in a very compact structure, as a whole, and which are foolproof in operation and safe and economical and are capable of long effective service, requiring very little if any maintenance with regard to the brake operating mechanism and the braking system of the vehicle.

Another object of my invention is to provide a mechanically or manually adjustable brake operating mechanism that is applied directly to the brake operating cam shaft which operates the brakes and, by simple turning movement of one element of my mechanism, this cam shaft is reset to a different position to effect proper adjustment and operation of the brakes and braking system as a whole.

Another object of my invention is to provide mechanically or manually adjustable brake operating mechanism which is applied to each of the brakes of the vehicle—applied to the cam operating shaft of the brakes—and which allows each brake, as wear takes place, to be properly adjusted so that all of the brakes on all of the wheels of the vehicle are similarly and properly adjusted so as to be applied simultaneously, the said mechanisms being such that, if desired, the set of rear brakes may be so adjusted as to be applied shortly before the set of brakes on the front wheels are applied, or all of the brakes may be adjusted so as to be applied simultaneously.

With these and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit of or sacrificing any advantages of the invention.

In the drawings:

Fig. 1 is a perspective view of my brake operating mechanism showing parts of the brakes in elevation and part of the operating mechanism for the brakes in elevation;

Fig. 2 is a vertical sectional view substantially along the line 2—2 of Fig. 1, looking in the direction of the arrows;

Fig. 3 is a vertical sectional view partly in section taken substantially along the line 3—3 of Fig. 2, looking in the direction of the arrows;

Fig. 4 is a view partly in perspective and showing certain parts in cross section, the parts being the casing and the ring gear and pawl mechanism;

Fig. 5 is a perspective view partly in section and broken away so as to show the inner part of the casing and part of the pawl mechanism disposed therein;

Fig. 6 is a perspective view of the ring gear with a part of the pawl mechanism integral therewith;

Fig. 7 is a perspective view of the ratchet gear;

Fig. 8 is a front elevational view of a spanner wrench.

The invention will be more readily understood by referring to the drawings in detail wherein the same reference characters all denote the same parts in the several views.

My brake operating mechanism is generally denoted at B and consists of a substantially cylindrical hollow casing 9, there being at one end of the casing a substantially circular closure portion 10 having a central circular opening 11 therein. On the inner face of this closure 10 there are a plurality of radially outwardly projecting segmental shaped projections 12, 13 and 14 and which projections are similar in outline and contour and provided therebetween are arcuate recesses 15, 16 and 17 which are open at their inner sides and closed at the rear by the said circular plate 10. This circular plate 10 is attached to the end of the casing by a forging or welding process and it will be noted that the outer curved surfaces of the projections 12, 13 and 14 are in contacting relationship with the inner surface of the wall portion 18 of the casing.

The end 19 of the casing 9, opposite where the projections 12, 13 and 14 are, and as seen from Figs. 4 and 5, is substantially smooth. The exterior of this said end of the casing is reduced in cross sectional diameter as indicated at 20, thus providing a substantially circular shoulder or abutment 21 about the exterior of the casing, for a purpose later described. Extending radially outwardly from one peripheral surface of the casing 9, there is a substantially rectangularly shaped arm 22 and which arm is relatively flat on its opposite surfaces and which is attached to the casing by a forging, welding or other process, and, in effect, is integral therewith. This projecting arm 22 is provided, adjacent its free or upper end 23, with a series of spaced screw-threaded openings 24, 25, 26 and, into these openings, suitable screw-threaded bolts 27, 28 and 29 are inserted, and these bolts pass through either of two superposed openings 30 and 31 at opposite sides thereof and through an opening 32 which is intermediate the said superposed openings. The intermediate opening 32, when the bolt 28 is secured therein, acts as a pivotal means for a brake releasing arm 33 which is adjustably attached to the arm 22 integral with the casing by means of the said bolts 27, 28 and 29 that pass through the openings 30, 31 and 32 of the arm. A brake operating rod 34 is attached by means of a bolt 35 to the brake releasing arm 33 adjacent inwardly of its free end 36.

A removable cover 37, having a hollow interior denoted at 38 in Fig. 2, and having a flanged portion 39 the interior dimensions of which are such that it can be snugly received over the reduced end portion 20 of the casing, serves as a closure for that end of the casing and this closure has a central opening 40 therein which coincides and registers in horizontal alignment with the opening 11 in the rear closure plate 10.

Housed within the casing, there is a ratchet gear denoted generally at 41, which ratchet gear has ratchet teeth 42 on one face thereof and is integral with or fixedly secured on a hub denoted generally at 43 and intermediate the ends of the said hub. This hub is hollow, of course, and is provided with internal, longitudinally extending, radially spaced splines 44. The portion of the hub 45, which is opposite the ratchet teeth 42 and extends outwardly therefrom, is of greater length than the remainder of the hub portion 46, and this latter hub portion has a series of radially spaced openings or recesses 47 therein.

A ring gear 48, having ratchet teeth 49 on one face thereof, and arcuate or segmental-shaped, spaced, integral projections 50 extending outwardly from the other face thereof with arcuate cut-out spaces S therebetween, is positioned in the casing with the spaced projections 50 fitting in the arcuate or segmental spaces 15, 16 and 17 and which spaces are between the arcuate blocks or segments 12, 13 and 14 at one end of the casing and with the segmental blocks 12, 13 and 14 positioned in the said spaces S in the pawl mechanism. Thus, the ratchet teeth 49 on the ring gear and pawl 48 are disposed so as to be disengagingly associated with the ratchet teeth 42 on the ratchet gear 41. When the ring gear and pawl means is in the casing 9, this ring gear, which has a central circular opening 51, is disposed on the longer part of the hub 45 of the ratchet gear and the projections of the ring gear 50 are, as aforesaid, in the spaces provided between the segmental pawl blocks 12, 13 and 14 positioned at one end of the casing, and the teeth of the ring gear 49 and the teeth of the ratchet gear 42 are adapted to be engaged with each other. It will be noted from Fig. 4 of the drawings that, when the segmental pawl members 50 are disposed in the spaces 15, 16 and 17 of the complementary pawl members carried by the casing, that there is a space R between the ends P of the pawl members 12, 13 and 14 at the ends T of the complementary pawl members 50 carried by the ring gear.

There are spaces R between each of the opposing surfaces P and T of the driven projections 50 and the driving projections 12, 13 and 14, such as shown in Figure 4, there being three of said spaces R.

In the use of the device, the said spaces R are ahead of the said driven projections. In other words, the projections 12, 13 and 14 in the casing and the projections 50 on the ring gear are together and in contact at all times, except as noted hereinafter. There is no lost motion in applying the brakes, as the said projections move forwardly and backwardly together as the brakes are applied and released, and remain in this position in relation to each other.

The purpose of the aforesaid spaces between the interengaging projections is to provide proper clearance between the brake lining and the drum after adjusting the brakes. The adjustment of the brakes is accomplished as follows:

The hub 43 is rotated by means of the spanner wrench W, in the same direction as when the brakes are applied. This rotative movement of the hub 43 will also, of course, rotate the ring gear 48, which rotative movement immediately closes up the spaces R between the two sets of the projections, the projections 12, 13 and 14 in the casing and the projections 50 on the ring gear, thus stopping further rotation of the gear ring. It is in this position that the brakes are adjusted. The brakes are now adjusted by continued rotative movement of the hub 43 by means of the spanner wrench which results in the casing moving laterally with respect to the cam shaft and allowing for disengagement of the teeth on the ratchet gear 41 from the teeth 49 on the ring gear 48. The hub is rotated an amount equal to one or more of the notches or teeth 42 on the gear ring 48, as required, until further movement is made impossible by the expanding of the brake shoes which causes the lining to contact the interior of the brake drum, in which position the notches or teeth of the hub and the ring gear are re-engaged in a new position relative to each other. In this position, the lining is too close to the brake drums and proper clearance must be provided to prevent over-heating and undue wear of the brake lining. Upon releasing the wrench from the hub, this clearance between the brake lining and the brake drum is provided by the contracting of the brake shoes and consequently rotative movement of the cam shaft, thus causing the hub and ring gear to rotate in the direction opposite that used in adjusting the brakes. The ring gear will rotate only so far as to close up the spaces between the two sets of projections, in which position all reverse movement of the ring gear, hub, cam shaft, brake shoes and lining will cease.

It follows that any predetermined clearance between the lining and the brake drum can be obtained by proper spacing between the two sets of projections. Further, as this clearance between the brake lining and the brake drum is obtained automatically, it is evident that no experience is needed to secure proper brake adjustment as this can be accomplished by the bus or truck driver.

It will be noted from Figs. 1 and 2 of the drawings, that the shorter portion 46 of the hub 43, which has the openings or recesses 47 therein, extends outwardly beyond the outer face 52 of the front housing closure 37. Interiorly of the closure 37, there are a series of spaced recesses 53 and coil springs 54 for the ends thereof disposed in the said recesses and the other end of the springs project beyond the recesses and separately engage the untoothed face 55 of the ratched gear 41 and serve to constantly urge the teeth of this ratchet gear into engagement with the teeth 49 on the ring gear.

Adjacent the central opening 56 in the front casing closure 37, there is a tapped opening 57 which has engaged therein the screw-threaded shank 58 of a bolt 59. The front closure for the casing 37, which is removable, has a depending substantially triangular shaped projection 60, which projection corresponds in shape with a similarly formed projection 61 at the lower part of the casing 9. The projection 61 has a screw-threaded opening 62 therein and the projection 60 of the closure has a stepped opening 63 therein, and which openings 62 and 63 are in alignment or registry and provide for the insertion therein of a screw-threaded bolt 64 which, along with the flange 39 of the front cover 37 and the reduced end portion 20 of the casing, serves as a means for detachably securing the cover 37 on the casing 9. It is to be further noted that the extreme outer end of the longer portion of the hub 45 may project slightly beyond or outwardly of the opening 11 in the rear closure plate 10 as indicated at 65 in Fig. 2.

The aforesaid described brake adjusting and operating means is mounted on the brake cam shaft C and the extreme end of this cam shaft is splined as at 66, and which splines cooperate with the interior splines 44 of the hub 43 and serves to position and hold the brake operating and adjusting mechanism on the end of said shaft. Centrally of the extreme end 67 of the cam shaft C, there is a tapped opening 68 which receives therein the threaded shank 69 of a headed bolt 70, which bolt passes through an opening 71 of a washer or retaining means 72. The inner face portion 73, adjacent the periphery of the washer or the like 72, see Fig. 2, abuts the extreme outer end 74 of the shorter hub portion 46 and thus the brake operating and adjusting means is effectively secured on or adjacent the end of the brake cam shaft C, and this cam shaft has at its other end, a cam 75. The cam 75 and the cam shaft C are conventional brake elements and the cam operates in a space between the flattened ends 76 of the brake mechanism which includes a pair of expanding and contracting brake shoes or the like 77 and 78, which are also conventional, and the usual spring 79 normally tends to keep the two brake elements 77 and 78 drawn toward each other. The brake operating rod 34 is connected directly with the air or other operating cylinder or means 80, and this means, of course, is conventional.

Assuming that my brake operating and adjusting mechanism has been mounted on the end of the brake cam shaft, as aforesaid, and that the brake operating rod is connected with the brake releasing arm 33, and that the bolt 59 has been screwed inwardly so that its end engages against the untoothed side 55 of the ratchet gear, and thus firmly engaging the ratchet gear teeth 42 with the ratchet gear teeth 49 on the ring gear, the brakes, if operated will cause the device to move simply as a lever on the end of the cam shaft and there will be no relative movement between any of the component parts of the brake operating and adjusting mechanism. However, we shall assume now that wear of the brake lining of the brakes, not shown, has taken place and it is desired to adjust the brakes, and, under such circumstances, all that is necessary is that the bolt 59 be backed away from and out of engagement with the said face of the ratchet gear and then, by placing the spanner wrench W and with the projection 81 thereof in one of the openings 47 of the hub, and turn the same, in the same direction in which the brakes are applied. The said cam shaft C will, therefore, be turned with the hub 43 which carries the ratchet gear 41, and the casing will move and allow the inter-engaged ratchet teeth 42 and 49 to become disengaged and moved one relative to the other and the cam shaft with it, space between the casing and ring gear 55 being provided thus effecting a resetting or adjusting of the position of the cam 75 and, consequently, a proper adjustment of the brakes. When this is accomplished, the said bolt 59 is again set into its engagement with the untoothed face 55 of the ratchet gear 41, and the said parts are then all again locked together and the brakes have been adjusted and the device serves then as a lever for operating the cam which effects operation of the brakes when the brake rod is caused to move and the brakes are, from there on until further adjustment is required, utilized in the usual way and, when necessary, the aforesaid manner of adjusting the brakes is repeated.

Incidentally, one end of the spanner wrench W is in the form of a cut-out wrench 82 which fits about the bolt head 59 so as to either set the bolt or loosen it as required. Thus, this simple tool provides for resetting the brakes quickly and effectively and is the only tool or device needed for accomplishing that purpose but, obviously, other tools or devices may be used.

The method of attaching arm 33 serves a very useful purpose when attached to the casing arm 22 integral with the casing 21, in that, if for any reason the brakes of the vehicle tighten up, by releasing the bolts 27 and 29 and slightly releasing bolt 28, the latter serving as a pivotal means, the said arm can be adjusted to a new position in order to release the brakes that have become tightened. The tension set up by tightening the brakes will result in the release of the arm on its pivot and the bolts, all of them 27, 28 and 29, are again tightened, thus, in effect, making the arm 33 integral with and operable along with the arm 22 that extends outwardly from the periphery of the casing 9.

From the foregoing, it is believed clear that I have provided a very effective manually or mechanically operated brake adjusting means. I have mentioned herein that the casing and some of its component elements are produced by forging, welding or the like but it is distinctly to be understood that any process or means may be utilized for the fabrication of my device or mechanism. Further, it is understood that the tolerances between the periphery of the ratchet gear 41 and the interior of the casing are such as to allow for proper turning and operation of the device and the same is true with regard to the ring gear 49 which carries the pawl members 50 thereon and is concentrically disposed about the longer portion 45 of the hub 43 of the ratchet gear.

I claim:

1. A manually adjustable slack adjusting mechanism for a brake operating device which acts as a lever and is attached to a cam shaft, the said device comprising a hollow casing within which there is disposed a circular ratchet gear with teeth on one face thereof, the ratchet gear being fixedly carried on a hub that extends beyond the opposite faces of the ratchet gear and with the opposite end portions of the hub extending beyond and outwardly of the casing, the said hub being adapted to be mounted upon one end of a cam shaft, a ring gear having projections integral therewith, the casing having projections therein engageable with the said projections of the ring gear, the teeth on the ring gear being normally fixed in engagement with the teeth on the ratchet gear, manually operable means for maintaining the teeth on the two said gears normally in fixed engagement with each other and to allow disengagement of the said teeth on the said gears when said last mentioned means is manually released, and a lever carried by the casing.

2. A manually operable slack adjusting mechanism adapted to be mounted upon a cam shaft, the said mechanism consisting of a hollow casing, a ring gear in said casing provided with teeth on one face thereof, a ratchet gear with teeth on one face thereof adapted for interengagement with the teeth on the ring gear, spring means normally urging the teeth of the two said gears together, the ratchet gear being carried on a hub adapted to be mounted about a cam shaft and one end of which projects beyond and exteriorly of the casing, manually operable means for maintaining the teeth of the two said gears in engagement with each other and capable of being manually released so as to allow disengagement of the said teeth of the gears, the said outwardly projecting portion of the hub being such that it can be manually turned by a suitable tool thus turning the cam shaft and resetting and adjusting same when the teeth of the two said gears are brought into manual disengagement.

3. A mechanically adjustable slack adjusting mechanism for vehicles comprising a hollow casing having projections therein, a ring gear within the casing having projections interengaging the projections of the casing and having ratchet teeth thereon and a ratchet gear also in the casing with the teeth of the said two gears adapted to be interengaged and to be released, manually operable means carried by the casing and contacting the ratchet gear for maintaining the teeth of the two said gears in interengaging relationship when tightened and said manually operable means also serving to allow the said teeth of the gears to be disengaged.

4. A mechanically adjustable slack adjusting mechanism comprising a hollow casing, a plurality of projections carried by the casing interiorly thereof, there being spaces between the said projections, a ring gear disposed in the casing and having projections with spaces therebetween similar to the projections carried by the casing, the projections on the ring gear and the projections on the casing being in interfitting relation and the dimensions of same being such that a clearance space is provided between confronting ends of the interengaging projections, a ratchet gear also disposed in the casing in cooperative relationship with the ring gear, manually operable means for allowing disengagement of the tooth of the ring gear from the ratchet gear for brake adjustment purposes and also serving under normal operating conditions to maintain the teeth of the ring and ratchet gear engaged.

5. A manually adjustable and slack adjusting device for vehicles comprising a hollow casing for fitting about a cam shaft, interengaging gear means within the casing, interengaging means between one of the gears and the casing, and means manually operated so as to allow for disengagement of the said gear means and also serving under normal operating conditions to maintain the teeth of the gear means engaged.

6. A manually adjustable slack adjusting mechanism consisting of a hollow casing for fitting about a cam shaft, arcuately shaped spaced projections carried in one portion of the casing, a ring gear having arcuately shaped projections thereon similar to the first mentioned projections, the projections on the ring gear fitting into spaces between the projections carried by the casing and the projections carried by the casing fitting into spaces between the projections on the ring gear, the dimensions of the said projections and spaces being such that a clearance space is provided between the confronting end surfaces of the projections which are in interengaging relationship, a ratchet gear in disengaging relationship with said ring gear also within another portion of the casing, the said ratchet gear being splined to the said cam shaft and having a portion thereof that is excessible exteriorly of the casing and which portion is adapted to be turned by a suitable tool, and manually operable means carried by the casing for normally maintaining the teeth of the ring gear and the ratchet gear in interengaging relationship and also being capable of manual release.

7. In a manually actuated adjusting mechanism including a cam shaft; a casing having a lever arm, a front closure for said casing formed centrally with a shaft receiving opening, a ratchet gear in said casing having a central hub adapted to fit about said cam shaft and be held against turning about the cam shaft, a ring gear loose about the hub, confronting side faces of said ratchet gear and said ring gear being formed with companion teeth, a rear head for said casing, said head and said ring gear being provided with interfitting extensions limiting turning movement of the same relative to each other, and a set screw mounted through a threaded opening in the front closure and engageable with the front side of the ratchet gear and tightened to releasably hold the teeth of the ratchet gear and the ring gear in engagement with each other.

8. In a manually actuated adjusting mechanism including a cam shaft; a casing adapted to fit about said cam shaft and having a lever arm, a ratchet gear in said casing having means for holding the ratchet gear against turning movement about the shaft, a ring gear in said casing back of said ratchet gear, confronting side faces of the ring gear and the ratchet gear having companion teeth, the casing and the ring gear having interfitting members limiting turning of the ring gear relative to the casing, and a manually actuated member carried by a portion of the casing and accessible externally of the casing for manual adjustment to effect movement into and out of position adapting it to secure the ratchet gear against turning in the casing.

9. A slack adjusting mechanism comprising a hollow casing, releasable interengaging means within the casing, manually operable means for maintaining the said interengaging means in engagement and for manually releasing the same for disengagement, one of said interengaging means being movable relative to the other to effect slack adjustment when the manually operable means is released, the said adjusting mechanism being adapted to be mounted on a cam shaft, and the said cam shaft being adjusted when one of said means is manually released and moved to effect slack adjustment.

10. A manually operated slack adjusting mechanism for a structure having a cam shaft, a manually adjustable means adapted to be mounted on and carried by the cam shaft and consisting of releasable interengaging members adapted to be mounted about the cam shaft, manually operable means for maintaining the interengaging members interengaged, and one of the said interengaging members being manually movable when released for slack adjusting purposes relative to the other of the said interengaging means.

KIRKLAND B. MacDOUGALL.

REFERENCES CITED

The following references are of record in the file of this patent:

UNITED STATES PATENTS

| Number | Name | Date |
|---|---|---|
| 907,053 | Huddle | Dec. 15, 1908 |
| 1,501,605 | Lane | July 15, 1924 |
| 2,015,881 | Alden et al. | Oct. 1, 1935 |
| 2,156,154 | Hooker | Apr. 25, 1939 |
| 2,347,186 | Freeman | Apr. 25, 1944 |
| 2,379,796 | Freeman et al. | July 3, 1945 |
| 2,385,621 | Freeman et al. | Sept. 25, 1945 |
| 2,385,622 | Freeman et al. | Sept. 25, 1945 |
| 2,481,319 | MacDougall | Sept. 6, 1949 |
| 2,522,903 | Shively | Sept. 19, 1950 |